C. H. GUNN.
FLEXIBLE AUXILIARY TREAD FOR PNEUMATIC TIRES.
APPLICATION FILED MAY 15, 1917.

1,299,707.

Patented Apr. 8, 1919.

WITNESS:
Bernard Privat

INVENTOR.
Charles H. Gunn
BY
Perry S. Webster
ATTORNEY.

UNITED STATES PATENT OFFICE.

CHARLES H. GUNN, OF LINCOLN, CALIFORNIA.

FLEXIBLE AUXILIARY TREAD FOR PNEUMATIC TIRES.

1,299,707.   Specification of Letters Patent.   Patented Apr. 8, 1919.

Application filed May 15, 1917. Serial No. 168,696.

*To all whom it may concern:*

Be it known that I, CHARLES H. GUNN, a citizen of the United States, residing at Lincoln, in the county of Placer, State of California, have invented certain new and useful Improvements in Flexible Auxiliary Treads for Pneumatic Tires; and I do declare the following to be a full, clear, and exact description of the same, reference being had to the accompanying drawings, and to the characters of reference marked thereon, which form a part of this application.

This invention relates to improvements in treads for pneumatic tires. The object of the invention is to produce an auxiliary tread to fit over the outer casing of a pneumatic tire and to stand the wear of the road surface. It is especially designed to fit over casings, the side walls of which are not worn out. With such auxiliary treads disposed over the casing, such casing will wear indefinitely and at the same time will not be subjected to punctures, tread blow outs and the like. A further object of the invention is to provide an auxiliary tread so it will be freely flexible in order to allow of the pneumatic tire functioning in the ordinary manner.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings, similar characters of reference indicate corresponding parts in the several views.

Figure 1:
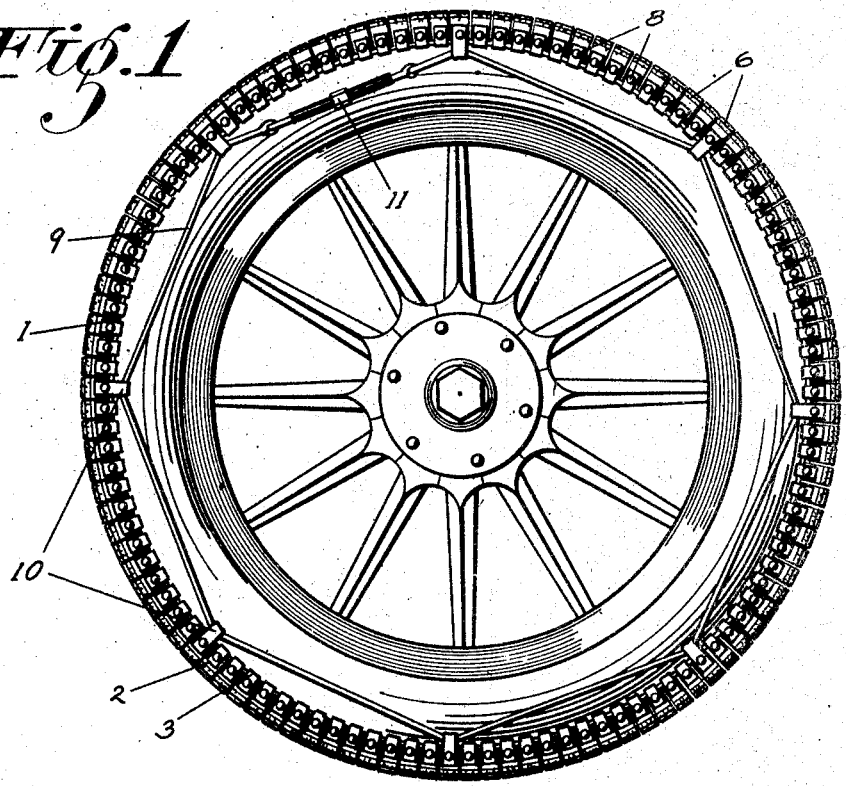
Figure 1 is a side elevation of a wheel carrying a pneumatic tire and showing my improved auxiliary tread installed thereon.
Figure 2:
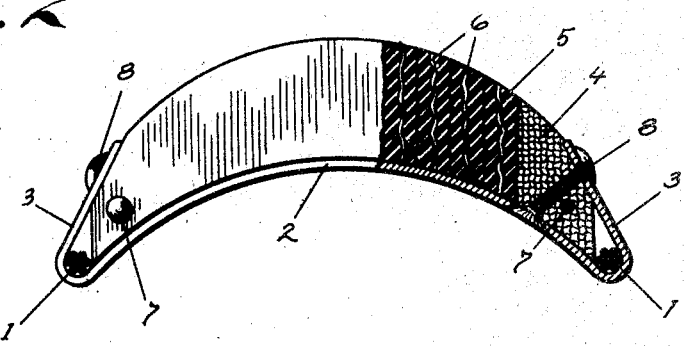
Fig. 2 is a side elevation partly broken out and in section of one of my improved tread sections.

Referring now more particularly to the characters of reference on the drawings my improved tread is first made up primarily of two endless cables 1 formed into rings, each being of a diameter slightly less than the outer diameter of the pneumatic casing over which the tread is to fit. The tread proper is then made up of a plurality of tread sections, each section comprising an iron plate 2 curved in cross section to conform to the shape of the tread of the pneumatic tire. The ends of these iron plates 2 are bent backwardly as at 3 so as to extend around the cables 1 whereby all of the tread sections will be held on the cables 1. The wearing portions are made up of small blocks of canvas 4 vulcanized in laminations of rubber 5 with a mass of vertical crimped crucible steel wires 6 embedded in the rubberized canvas. These wear strips are each provided with a transverse rivet 7 at each end thereof to reinforce the same and prevent them from spreading or splitting at the ends. Such strips are securely fixed to the iron members 2 by means of rivets 8, which rivets 8 extend through the turnback portions 3 of the plates 2 at points above the rivets 7. These rivets 8 hold the wear strips fixed to the iron plates 2 and at the same time strengthen and reinforce them. The wearing strips extend a considerable distance beyond the outer surfaces of the members 3 so as to present the rubberized reinforced material to the wear of the road surface. The wear of the same is greatly minimized by the presence of the wires 6. The sides of the wear strips project beyond the sides of the iron plates 2 so as to fill in the interstices between the same whereby almost a solid surface is presented when one of my auxiliary treads is mounted upon a pneumatic tire.

In order to apply my auxiliary tread to a pneumatic tire I first deflate the tire and then place my auxiliary tread over the same. Upon the tire being inflated it will tighten out against the tread and hold the same in place. In order to make certain that the tread will not loosen from the casing I provide an auxiliary cable 9 which extends through elongated projections 10 on certain ones of the plates 2. This cable 9 is provided with a turn-buckle 11 for giving the same proper tension to insure the auxiliary tread from being lost or loosened from the pneumatic casing. The eyes for the cable 1 formed by the turn-back portions 3 are sufficiently loose relative to the cable to allow such cable to move or slip through the same freely thus making the plates 2 entirely flexible with respect to the said cables 1 so there will be no bending or breaking strain between the two. The iron plates 2 are sufficiently strong so that they will not get out of shape but will hold the rubberized canvas wear strips firmly and against undue strain as the casing yields beneath the irons. When inflated the casing will fit snugly against the irons and will not slip beneath the same.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

An auxiliary tread for pneumatic tires comprising a plurality of independent tread sections, each tread section comprising a metallic plate curved to conform to the cross section of the tire and with its outer ends bent inwardly for a certain distance to form a V, a wearing block carried on the plate and projecting between the V-shaped portions of the plate, the wearing block being secured to the plate by rivets passing through the block and the sides of the V-shaped portions of the plate, and transverse rivets through the wearing block adjacent the securing rivets whereby the wearing block is reinforced and prevented from splitting.

In testimony whereof, I affix my signature in the presence of two witnesses.

CHARLES H. GUNN.

Witnesses:
W. M. SPARKS, Jr.,
C. P. MUSSER.